Feb. 19, 1963 E. W. FRITTS 3,077,914
SELF-BALANCING WHEEL FOR AUTOMOTIVE VEHICLE
Filed June 28, 1961
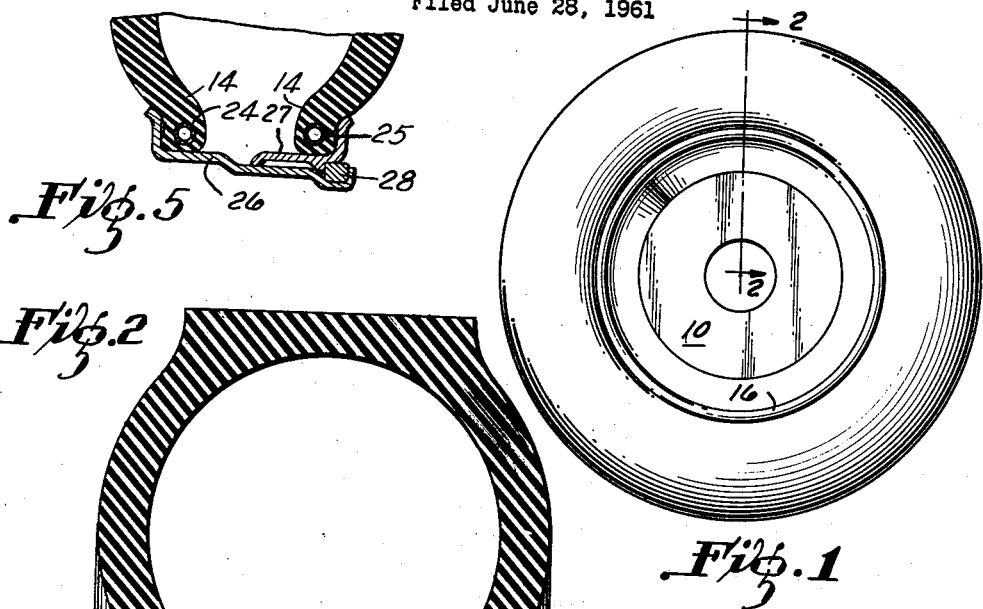
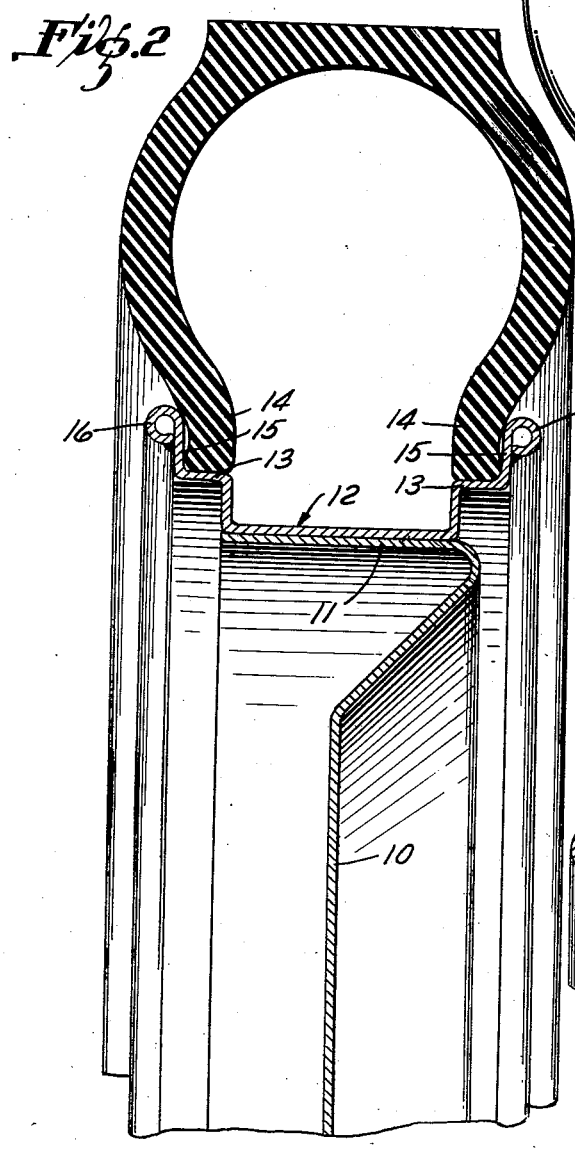
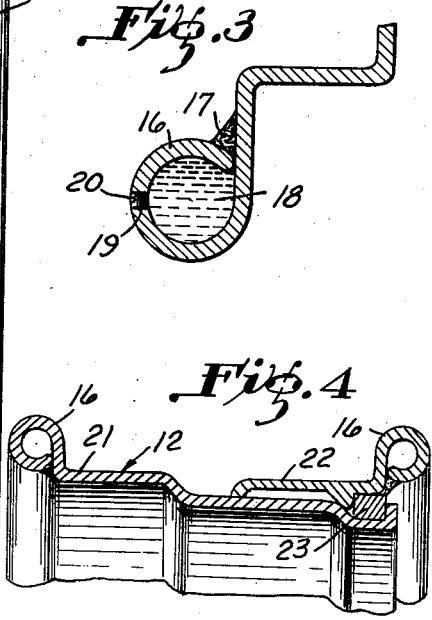
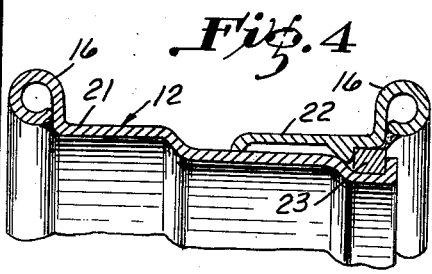
INVENTOR
Earl W. Fritts
BY Lowry & Rinehart
ATTORNEYS

United States Patent Office 3,077,914
Patented Feb. 19, 1963

3,077,914
SELF-BALANCING WHEEL FOR AUTOMOTIVE VEHICLE
Earl W. Fritts, Orange Park, Fla. (4740 Opache Ave., Jacksonville 10, Fla.)
Filed June 28, 1961, Ser. No. 120,384
1 Claim. (Cl. 152—330)

This invention relates to self-balancing wheels and more particularly to self-balancing wheels for automotive vehicles.

The problems caused by unbalanced wheels are well known to all motorists. The unbalance may be due to inaccuracies in the metal portions of the wheel, but the more significant unbalance is usually due to irregularities in the tire construction. At low speeds, such unbalance is only a minor problem, but with modern high speed cars and roads, the unbalanced wheel becomes a major problem.

Most of the effects of unbalance are well known, and these effects include undesirable or dangerous shimmy in the steering mechanism of the car, uneven wear on the pneumatic tires, and increased wear on bearings, front end suspension systems and the like. Since most of the unbalance is due to tire structure, it is necessary to rebalance the wheel each time a new tire is applied, each time when tires are rotated to secure even wear, or when the process of wear itself has changed the weight distribution of the tire. This constant rebalancing is inconvenient and costly.

Previous attempts have been made to provide a self-balancing wheel, and more particularly by placing a fluent material in an annular chamber on the wheel structure. Examples of these prior constructions are U.S. Patents 2,853,344, 2,687,918 and 2,737,420. None of these prior structures, however, have been satisfactory. For reasons which will be further developed in more detail, the prior art structures, including structures shown by the patents listed, have failed to achieve the balance desired. Further, the structures disclosed have involved major structural changes in the wheel. The addition of the balancing chamber has added materially to the weight of the wheel and placed an awkward structure where it tends to interfere with the proper application of the tire.

The prior art structures have failed to achieve a proper balance because they did not take into account the complex nature of the problem that is involved in true balance of a vehicle wheel. The first factor that must be taken into consideration is the distribution of the weight in the wheel structure relative to the axis of rotation of the wheel. An unbalance in the wheel relative to said axis of rotation tends to cause a translation of the entire wheel axis. The balance of a wheel relative to its axis of rotation is tested by means of a static balance test. The wheel is balanced at its center upon a point fulcrum, and the force of gravity then, if the wheel is unbalanced, will tend to tip the wheel in the direction of the unbalance. However, there is another important factor that must be considered, namely, the balance of a wheel structure relative to a median plane passing through the entire wheel at the center of the wheel. When there is unbalance relative to this plane, the wheel at high speed tends to twist relative to its axle, causing an orbital type movement of the wheel axle. Prior art structures involving a single balancing tube have attempted to handle the so-called static balance, but have failed to handle the equally serious problem of balance of the wheel relative to a plane through the wheel.

It is an object of the present invention, therefore, to provide a self-balancing wheel which will automatically compensate for unbalance of the wheel about a plane through the wheel, as well as unbalance of the wheel relative to the axis of rotation thereof.

Still another object of the invention is to provide a self-balancing wheel wherein the means for balancing the wheel does not add materially to the weight or bulk of the wheel and does not interfere in any way with the seating of the tire on the metal portion of the wheel.

It is another object of the invention to provide self-balancing means which is equally adaptable to a fixed wheel flange structure or to a lock ring type wheel structure, such as used on heavy duty vehicles, namely, trucks and the like.

More specifically a primary object of the invention is to provide a structure wherein the self-balancing means is incorporated in the bead of the tire itself.

With the above and other objects in view, as will be presently apparent, the invention consists in generally of certain novel details of construction and combination of parts hereinafter fully described, illustrated in the accompanying drawings, and particularly claimed.

In the drawings, like characters of reference indicate like parts in the several views, and FIGURE 1 is a side elevational view of the complete wheel incorporating one form of the self-balancing means;

FIGURE 2 is an enlarged fragmentary cross-sectional view taken on the line 2—2 of FIGURE 1;

FIGURE 3 is a fragmentary cross-sectional view of one of the wheel flanges, showing the structure in somewhat enlarged detail and further showing the filling plug which is used on each fluid chamber;

FIGURE 4 is a fragmentary cross-sectional view showing a balancing means as applied to conventional lock ring type wheels, as used on trucks, heavy trailers and the like; and FIGURE 5 is a fragmentary cross-sectional view of my invention wherein the self-balancing tubes are imbedded in the spaced beads of an automobile tire.

In the form shown in FIGURES 1, 2 and 3, the reference numeral 10 represents the wheel disc of a vehicle wheel. This disc is provided with the usual flange 11 to which is fastened, by welding or the like, the rim 12 of the wheel. The rim 12 is provided with offset shoulders 13 which receive the spaced beads 14 of the standard pneumatic tire.

The marginal flanges 15 of the wheel rim are rolled back upon themselves to form the tubular fluid chambers 16 of the present invention.

The chambers 16 are preferably formed by rolling the metal until it engages the outer face of the marginal flanges 15 of the wheel rim, the joint being then sealed by welding 17, brazing, or any other suitable means. If desired, the tubular fluid chambers could also be formed integrally.

It will be understood, therefore, that the tubular fluid chambers 16 are in the nature of continuous, annular, sealed tubes. The tubular chamber 16, so formed, is partially filled preferably with a heavy density material, such as mercury or the like. Alternately, a fluent solid could be used, such as small steel or lead balls, granular metal, sand, or any other material which would normally be free to flow within the tubular fluid chambers 16.

In order to provide a means for filling the tubular fluid chambers 16 with the fluid material to the desired level, there is preferably provided in each of the tubular chambers a threaded port 19, which contains a filler plug 20.

The view of FIGURE 4 shows balancing means as applied to the well known snap ring type of wheel rim. In this case, the rim 12 is formed of two sections 21 and 22. For placement of the tire on the rim, the section 22 is removed from the section 21 by sliding it in the direction of the axis of rotation of the wheel. The tire is then slipped on the section 21, the section 22 slipped over the end of the section 21, and a snap ring 23 then snapped into place to lock the two sections. As in the first modification, the tubular chambers 16 are formed on the flanges of the rim, and the wheel structure may be disassembled without harm to the tubular chamber on the section 22.

In the structure of FIGURE 5, the beads 14 of the tire have molded into the beads the annular tubular rings 24 and 25. Before the rings 24 and 25 are molded into the tire structure, they are partially filled with the fluid or fluent material in the manner of the first and preferred form of the invention. In this structure, it would be necessary as a practical matter to use the locking ring type of wheel structure, as shown, namely, a first section 26, a second section 27, and a locking ring 28. This is necessary to prevent injury to the tubes 24 and 25 which might otherwise occur in the distortion of the tire structure necessary to get a tire onto a fixed rim.

*Operation*

It will be noted that the tubular fluid chambers 16, 24 and 25 provide a continuous closed path for the fluid or fluent material 18, which partially fills the tubes.

As the wheel rotates and gains speed, centrifugal force will cause the mercury or other fluid or fluent material 18 to move toward the outer wall of the tube. If the wheel is in perfect balance, the fluid or fluent material 18 will be evenly distributed around the tube, lining the outer wall thereof. If the wheel is unbalanced, however, the mercury will take a position within the tubes 16 tending to correct the unbalanced condition of the wheel.

It will be noted that if the unbalance is due to an unbalance about the axis of rotation of the wheel, the mercury in both of the tubes 16 or tubes 24 and 25 will tend to correct such unbalance. If the unbalance, however, is due to weight distribution in the wheel such that the unbalance is about a median plane extending through the wheel transversely of the axis of rotation, then there will be a differential positioning of the fluids in the tubes so as to compensate for the unbalance.

Thus, it will be seen that in the present invention the wheel is completely self-balancing for both types of wheel unbalance. The higher the speed and the greater the centrifugal force, the more effective is the balancing arrangement. Tires may be changed or interchanged at will without the expense or inconvenience of having a wheel balanced each time the change is made.

It may be pointed out that while the invention has been disclosed relative to a vehicle wheel, the concept of the spaced balancing tubes on opposite sides of a median plane through the wheel at right angles to the axis of the wheel would apply equally well to any type of wheel, or to any type of flywheel or rotor. It is important to have dynamic balance to reduce vibration and other erratic forces which are present due to rotation at relatively high speeds.

While there have been shown and described herein modifications of the balancing means, it will be understood that minor changes may be made therein without departing from the spirit and scope of the invention as claimed.

What is claimed is:

In a self-balancing wheel structure, said wheel including a wheel rim and a pneumatic tire having inwardly directed beads engaging said rim, a pair of spaced, annular, tubular chambers, each of said chambers being associated with a tire bead and disposed on opposite sides of a median plane through said wheel at right angles to the axis of rotation of said wheel, each of said chambers being partially filled with a relatively heavy fluent material, said annular, tubular chambers being buried in said tire beads.

References Cited in the file of this patent

UNITED STATES PATENTS

| | | |
|---|---|---|
| 659,557 | Smith | Oct. 9, 1900 |
| 1,209,730 | Leblanc | Dec. 29, 1916 |
| 1,314,005 | Louden | Aug. 26, 1919 |
| 2,687,918 | Bell et al. | Aug. 31, 1954 |
| 2,909,389 | Wilborn | Oct. 20, 1959 |
| 2,992,045 | Martenet | July 11, 1961 |

FOREIGN PATENTS

| | | |
|---|---|---|
| 282,965 | Great Britain | Jan. 5, 1928 |
| 832,048 | Great Britain | Apr. 6, 1960 |